(12) United States Patent
Ogram

(10) Patent No.: US 6,801,987 B2
(45) Date of Patent: Oct. 5, 2004

(54) ANTI-HACKING SYSTEM

(76) Inventor: Mark Ellery Ogram, 780 S. Freeman Rd., Tucson, AZ (US) 85748

(*) Notice: Subject to any disclaimer, the term of this patent is extended or adjusted under 35 U.S.C. 154(b) by 172 days.

(21) Appl. No.: 10/180,663

(22) Filed: Jun. 26, 2002

(65) Prior Publication Data

US 2004/0003186 A1 Jan. 1, 2004

(51) Int. Cl.7 .............................................. G06F 12/16
(52) U.S. Cl. ....................................... 711/154; 711/162
(58) Field of Search ................................. 711/154, 162, 711/147, 148; 704/6; 707/204; 709/214, 216

(56) References Cited

U.S. PATENT DOCUMENTS

| | | | | |
|---|---|---|---|---|
| 5,434,994 A | * | 7/1995 | Shaheen et al. ............. 709/223 |
| 5,666,530 A | * | 9/1997 | Clark et al. .................. 707/201 |
| 5,684,990 A | * | 11/1997 | Boothby ...................... 707/203 |
| 5,710,922 A | * | 1/1998 | Alley et al. .................. 707/201 |
| 5,727,202 A | * | 3/1998 | Kucala ......................... 707/10 |
| 5,742,820 A | * | 4/1998 | Perlman et al. ............. 707/201 |
| 6,000,000 A | * | 12/1999 | Hawkins et al. ............ 707/201 |
| 6,259,442 B1 | * | 7/2001 | Britt et al. ................... 345/721 |
| 6,330,618 B1 | * | 12/2001 | Hawkins et al. ............ 709/248 |
| 6,401,112 B1 | * | 6/2002 | Boyer et al. ................ 709/206 |
| 6,571,347 B1 | * | 5/2003 | Tseng ............................. 714/6 |
| 6,625,754 B1 | * | 9/2003 | Aguilar et al. ............... 714/15 |

* cited by examiner

Primary Examiner—Hiep T. Nguyen

(57) ABSTRACT

A system which discourages corruption of data within a network of computers. A refresh computer monitors the information within a hosting computer and periodically refreshes the information. The hosting computer provides the information to remote computers via the network. The refreshing action occurs either periodically or when a corruption of the information is detected. In some embodiments of the invention the hosting computer and the refresh computer are contained within the same housing; in other embodiments, the hosting computer and the refreshing computer communicate via the primary network or a secondary network.

20 Claims, 5 Drawing Sheets

ANTI-HACKING SYSTEM

BACKGROUND OF THE INVENTION

This invention relates generally to computer systems and more particularly to computer systems used on as a distributed network of computers.

Whenever a computer is connected to a network (such as the Internet or any other publicly accessible system), corruption of the data/information on the computer increases significantly. While there is a slight risk that increased use of the computer's data/information will cause the data/information to generate "bugs", the biggest risk comes from the intentional interference with the data/information by third parties.

Commonly called "hacking", a significant number of users find joy in the challenge of going into another's computer and either leaving a "tag" (changing the image or verbiage) or withdrawing proprietary information.

In the case of information used for national security, a large number of "firewalls" and other techniques are used to assure that only authorized personnel have access to the information. These techniques and firewalls require a great deal of maintenance and expertise to keep them from failing as there is always pressure from hackers trying to improperly enter the sites.

In the case of commercial sites, everyone is "authorized" and everyone represents a potential customer; but, all too often a hacker will enter the site and alter the site's verbiage or graphics to present an image other than that sought by the owner of the site.

As example, a commercial site that supplies automobile parts for a particular brand of vehicles, would not like a hacker placing denigrating comments,about that brand of vehicle on the site.

In some cases, these "hackings" are obvious and the owner of the site is able to review the material periodically; but, when the commercial site grows to include hundreds or even a thousand pages, a simple review is never enough.

Another pronounce problem that commercial sites have encountered is the protection of sensitive information. With the expanding use of credit cards for purchases, the site's data base of submitted credit cards can be just too tempting, thereby encouraging a hacker to obtain the credit card information for criminal activities.

It is clear from the forgoing that there is a need to preserve the integrity of material which is placed on a distributed system of computers such as the Internet.

SUMMARY OF THE INVENTION

The present invention creates a system which discourages corruption of data within a network of computers.

In this context, the use of the term "network" is meant to apply a wide range of computer interconnecting systems well known to those of ordinary skill in the art, such as but limited to: the Internet, Intranets, and modem based bulletin boards.

Within this discussion, the terms "information" and "data" are interchangeable and are used to include any material deliverable by one computer to another. This includes, but is not limited to such items as: images, text, programs, and hyper-links. Those of ordinary skill in the art readily recognize other such materials.

In general, the system employs the use of a hosting computer with which a consumer interacts to obtain the information or data. A second computer, referenced as the refresh computer, serves to monitor the data/information within the hosting computer.

The refresh computer monitors the information within the hosting computer and preserves its integrity through one of two principal ways by refreshing the data: (1) periodically; or, (2) whenever a corruption of the information is detected.

In the case of periodically refreshing the data, pre-determined data/information is stored on the refresh computer. After a defined time period has elapsed, the refreshing computer erases the information/data on the hosting computer and replaces it with the pre-determined data/information onto the hosting computer.

The time period is often set at a short period of time (say every five minutes), but in some embodiments, a user of the refresh computer is able to define the time period between refresh activities to meet the needs of the particular site. A site that is more prone to hacking may have a time period of a minute or less; another less critical site might do the refresh every hour.

In doing this, any corruption that may have existed is erased and the commercial site is assured that its data/information is kept at the pre-determined status. Since the hacker's efforts are constantly being erased, the "joy" that the hacker experiences is short-lived; thereby encouraging the hacker to seek out easier sites where his/her efforts will be noticed.

In the second methodology, the information/data within the hosting computer is compared with the pre-determined information/data on the refreshing computer; if a match does not exist (thereby indicating that a corruption problem exists), then the refreshing computer erases the information/data within the hosting computer and places the good information/data in the hosting computer for dissemination therefrom.

By keeping the information/data within the refresh computer away from, network access, the user is assured that it cannot be hacked.

In some embodiments of the invention, the hosting computer and the refresh computer are contained within the same housing. This embodiment is particularly useful as it creates a single site for the entire operation and provides a system that transparently provides anti-hacking capabilities.

In other embodiments, the hosting computer and the refresh computer communicate via the network used by the hosting computer and the customer. This embodiment allows a single refresh computer to have easy access to a variety of hosting computers.

In yet another embodiment, a secondary network is used as the link between the refresh computer and hosting computer. Those of ordinary skill in the art recognize a variety of such secondary networks, such as, but limited to, phone lines with the use of modems.

The invention, together with various embodiments thereof, will be more fully explained by the accompanying drawings and the following description thereof.

DRAWINGS IN BRIEF

FIG. 1 is a block diagram of a typical computer.

FIGS. 2A, 2B, 2C, and 2D are functional block diagrams of differing embodiments of the present invention.

DRAWINGS IN DETAIL

Figure 1:
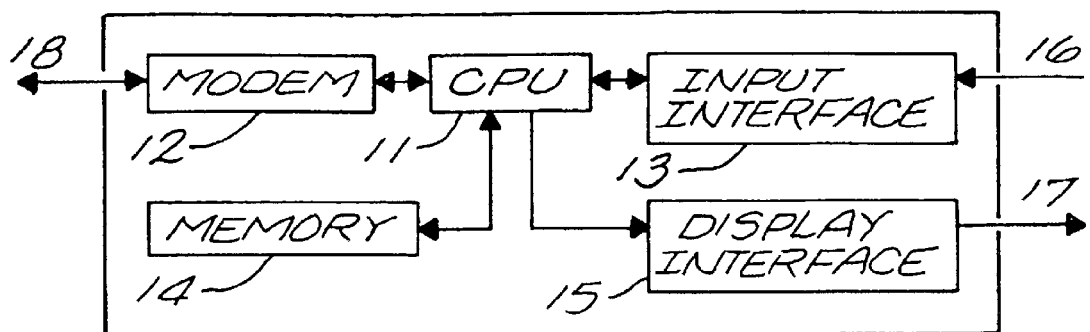

FIG. 1 is a block diagram of a typical computer.

While FIG. 1 diagrams a typical computer, those of ordinary skill in the art readily recognize that a large number of variations and alternative designs are available for a computer. The invention is not intended to be limited to this sole configuration.

Computer 10 contains a Central Processing Unit (CPU) 11 which controls the functions of the assembly. CPU 11 is able to draw data from memory 14 and also to place data into memory 14. Memory 14 includes both volatile memory and non-volatile memory.

Data from memory 14 is used by CPU 11 and is communicated to a network 18 (such as the Internet or phone system) via modem 12. In some embodiments, modem 12 is replaced with a different type of interface to meet the needs of the particular network 18 being addressed.

CPU 11 is able to communicate with an operator via input interface 13 which receives operator generated information 16 (such as from a keyboard or a touch pad). Visual information is communicated to the operator via a visual display device 17 which is driven by display interface 15.

FIGS. 2A, 2B, 2C, and 2D are functional block diagrams of differing embodiments of the present invention.

Figure 2A:
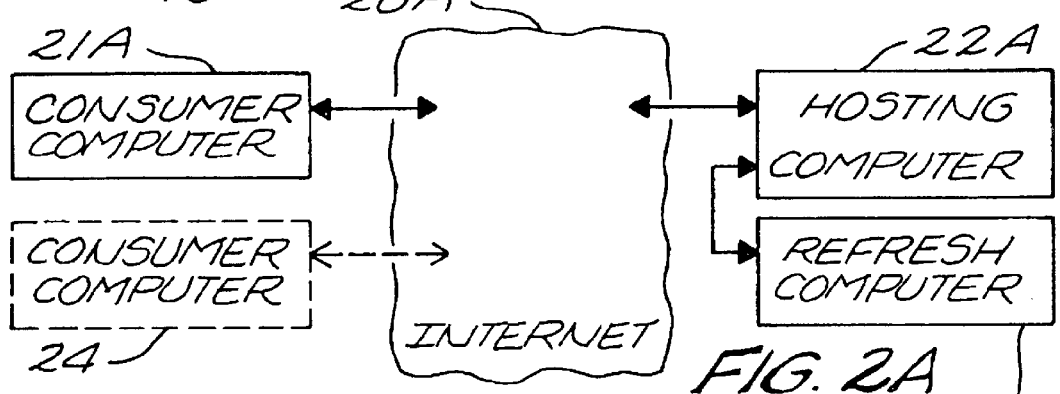

FIG. 2A is the preferred embodiment of the invention. In this illustration, Internet 20A is used as the computer networking system; those of ordinary skill in the art readily recognize a variety of networks which are suitable in this situation. This includes, but is not limited to: phone systems, intranets, and wireless networks.

Consumer computer 21A communicates with hosting computer 22A via Internet 20A. Hosting computer 22A contains informational data and ordering information. This data includes promotional material on products offered for sale by hosting computer 22A, reference information (such as a library would provide), as well as many other types of information.

Further, hosting computer 22A is able to receive data from consumer computer 21A via the Internet 20A. This type of information often includes sensitive or private information such as financial records (i.e. credit card numbers and checking account numbers), information identifying the user of consumer computer 21A (i.e. social security numbers), and personal data (i.e. health records).

As noted earlier, often hackers want to either disrupt the informational data or want to obtain the sensitive data.

Refresh computer 23A communicates with hosting computer 22A to monitor the integrity of the data within hosting computer 22A. The integrity of the data within hosting computer 22A is assured by either: periodically refreshing the data within hosting computer 22A with pre-determined data from refresh computer 23A; or, by checking the data within hosting computer 22A with the pre-determined data from refresh computer 23A and refreshing hosting computer 22A if an error is detected.

In practice, the web designer for hosting computer 22A supplies the pre-determined data to the refresh computer 23A to use as a template. Since refresh computer 23A, in this embodiment, only communicates with hosting computer 22A and is not capable of communicating via Internet 20A, the predetermined data within refresh computer 23A remains "unspoiled".

As further security, sensitive information supplied by the user of consumer computer 21A is periodically pulled from hosting computer 22A and erased from hosting computer 22A. This sensitive data is kept on refresh computer 23A, away from the hacker's access.

As shown in this figure, other consumer computers 24 are also able to operate in the same manner as outlined above relative to consumer computer 21A.

Figure 2B:
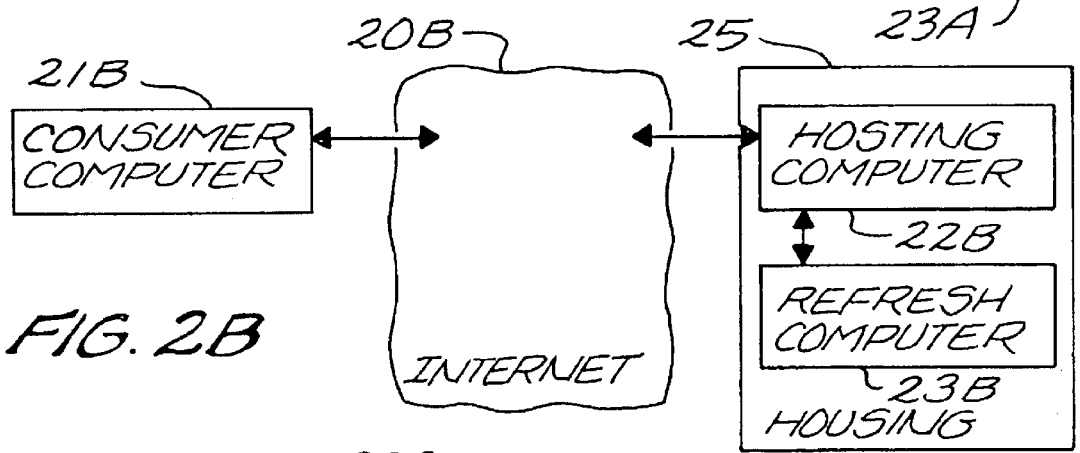
Figure 7:
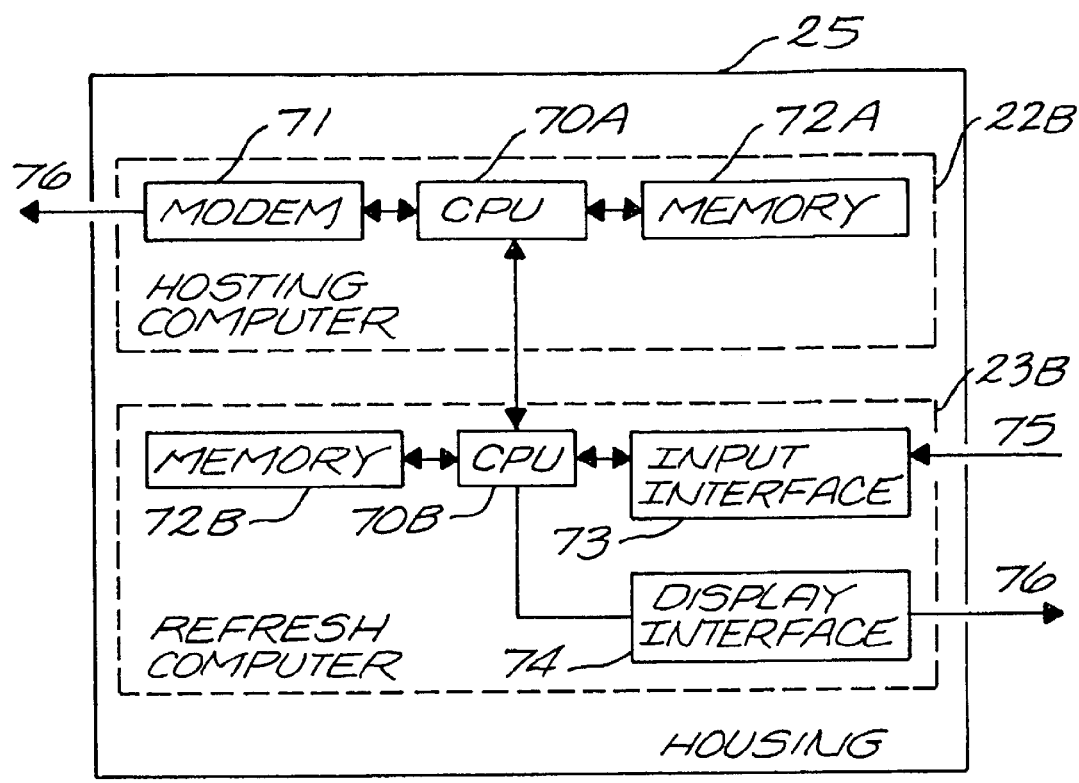
FIG. 7 is a block diagram of a system which places the refresh computer and the hosting computer within a single housing.

FIG. 2B is an alternative embodiment of the invention in which the hosting computer 22B and the refresh computer 23B are located within the same housing 25. FIG. 7 gives a block diagram of one configuration for this embodiment.

As before, hosting computer 22B and consumer computer 21B share information via Internet 20B. Although only a single consumer computer 21B is depicted, this embodiment, together with the other embodiments, contemplate numerous consumer computers accessing Internet 20B.

The data/information on hosting computer 22B together with the sensitive data provided by the user of consumer computer 21B is protected by refresh computer 23B.

In this embodiment, hosting computer 22B and refresh computer 23B are contained within housing 25. This embodiment is particularly useful for an Internet Service Provider (ISP) as the single housing provides for a secure treatment of data; and, this security is "transparent" to the ISP user. To the ISP user, the web page and programs are merely stored on the refresh computer 23B, which automatically up-grades and maintains the web-pages and programs on hosting computer 22B.

Figure 2C:
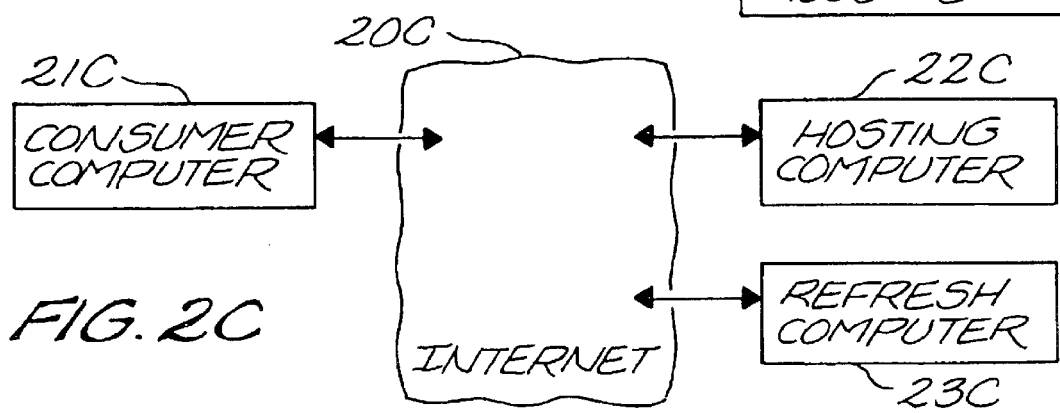

FIG. 2C is an alternative embodiment of the invention in which refresh computer 23C and hosting computer 22C communicate via the network.

Consumer 21C is able to obtain information/data from hosting computer 22C via Internet 20C. As described earlier, sensitive data from the consumer 21C is communicated to hosting computer 20C via Internet 20C.

The refreshing of the information within hosting computer 22C and the withdrawal of the sensitive data within hosting computer 22C is accomplished the same as outlined above, except that, in this embodiment the communication between refresh computer 23C and hosting computer 22C is accomplished via Internet 20C. Ideally, to provide added security, refresh computer 23C is not accessible by any other computer over Internet 20C; and, refresh computer 23C only communicates with hosting computer 22C.

While the discussions herein are directed to a single refresh computer communicating with a single hosting computer, the invention is not so limited. Another embodiment of the invention allows for a single refresh computer to assist a number of hosting computers by cycling through all of them to assure each hosting computer's integrity.

Figure 2D:
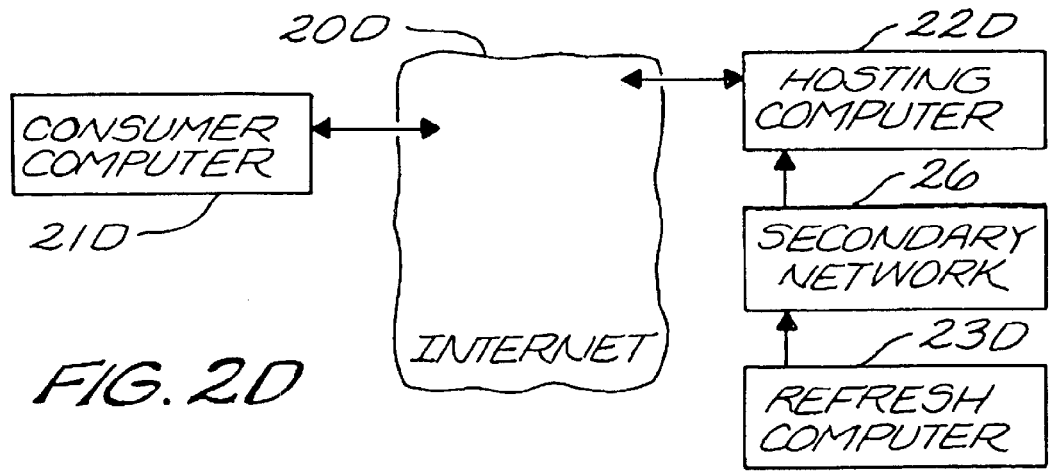

FIG. 2D illustrates an embodiment of the invention in which a second network is used for the communication between the refresh computer and the hosting computer.

As described earlier, consumer computer 21D exchanges data and information via Internet 20D with hosting computer 22D. Also, as described above, refresh computer 23D is used to maintain the integrity of the contents of hosting computer 22D.

In this embodiment though, refresh computer 23D and hosting computer 22D communicate via a secondary network 26. Those of ordinary skill in the art recognize a variety of secondary networks such as an intranet or a phone system.

Figure 3:
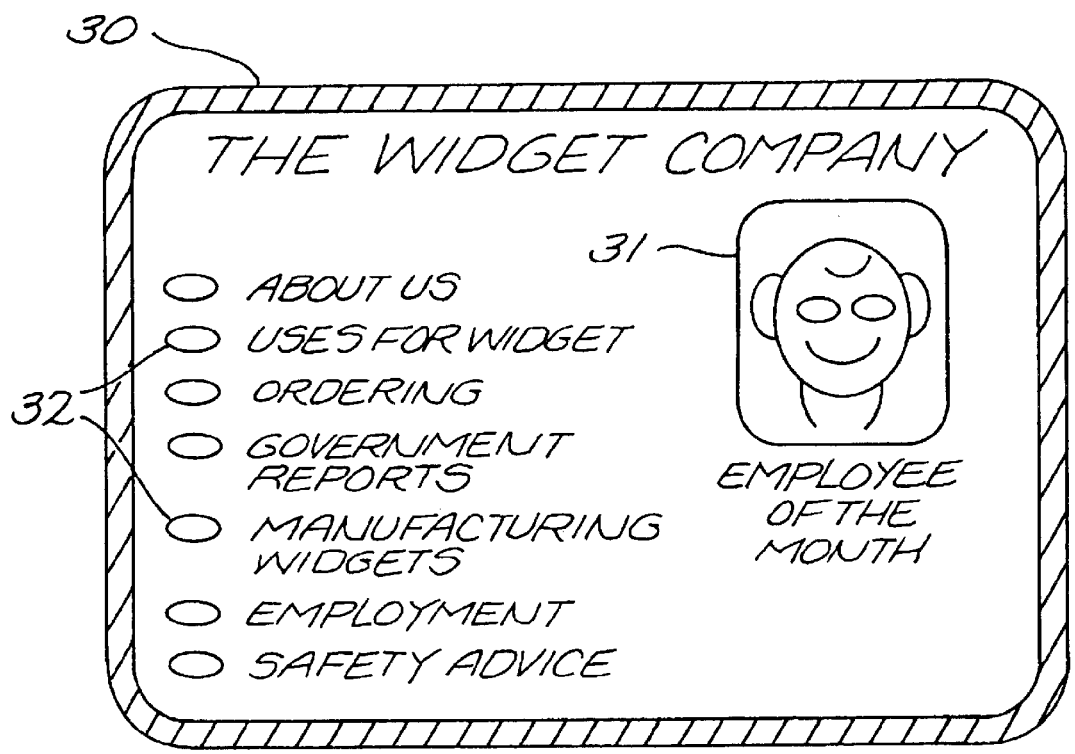
FIG. 3 illustrates a typical screen display at the consumer/remote-user site.

FIG. 3 illustrates a typical screen display at the consumer/remote-user site.

Screen 30, in this illustration shows a fictitious company's web-page giving a photograph 31 together with various links 32. A hacker might change the photograph to a derogatory one, or might change the links (or their underlying page) for some purpose. The present invention maintains the program defining this page as pre-determined data in-the refresh computer. By selectively refreshing this data/information within the hosting computer, the hosting computer is assured that the data/information is correct and the web-page remains as intended.

As example, if a hacker were to change the information/data on the hosting computer, then this alternation would be noticed and automatically refreshed; thereby eliminating the hacker's efforts. The elimination of the "fruits" of the hacker's efforts, significantly dissuades the hacker from altering this site.

Figures 4, 5:
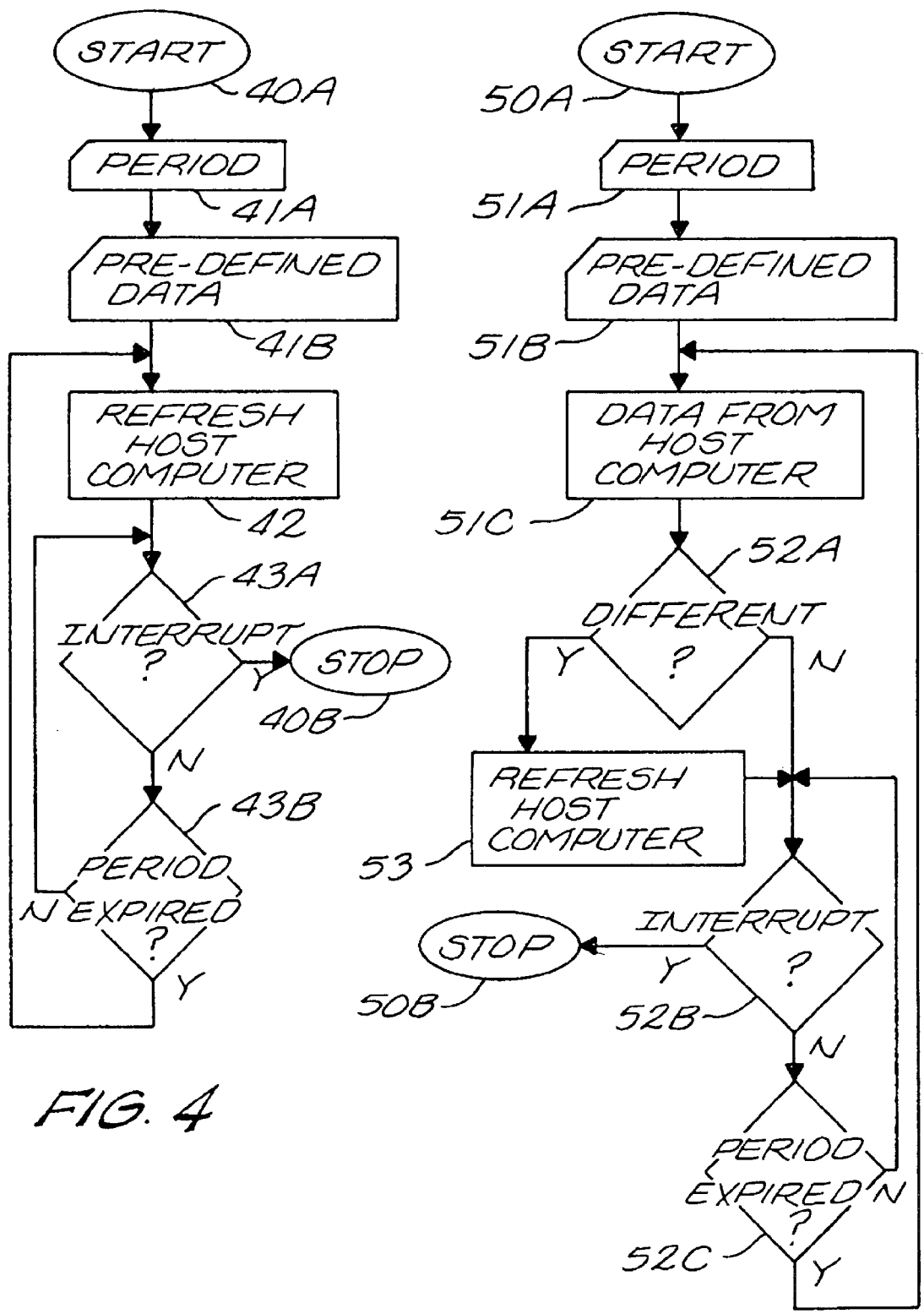
FIG. 4 is a flowchart of the preferred embodiment of the invention.
FIG. 5 is a flowchart of an alternative embodiment of the invention.

FIG. 4 is the preferred flowchart of the operation of the refresh computer.

Once the program has started 40A, the user of the system enters the time period 41A which is to be used for the operation. In this embodiment, the contents of the host computer are refreshed automatically at the end or beginning of the time period. While this time period is optionally any time selected by the user, a shorter time period is, called for when the host computer is more active.

The program pulls the pre-defined data from memory 41B and the contents, (information/data) of the host computer are refreshed 42.

The program then checks for an interrupt 43A from the operator of the refresh computer indicating that the program is to stop 40B. If no interrupt has been received 43A, then the time lapse is checked to see if the period has expired 43B; if it has, then the contents of the host computer are refreshed 42; otherwise, the program returns to check for an interrupt 43A.

In this manner, the refresh computer continuously refreshes the contents of the host computer; thereby assuring the integrity of the contents of the host computer.

FIG. 5 is a flowchart of an alternative embodiment of the invention.

After start 50A, the period for review is collected 51A. While the period is sometimes entered by an operator of the refresh computer, in some cases the period is stored within the memory of the refresh computer in a data file and is simply retrieved after start of the program.

The pre-defined data 51B is withdrawn from the memory of the refresh computer and the corresponding data from the host computer is obtained 51C.

A comparison between the pre-defined data and the host computer's data is then made 52A to see if there is a difference. If a difference exists, then the contents within the host computer are refreshed; otherwise a check is made to see if the operator of the refresh computer has interrupted the program 52B. If there is an interrupt, then the program stops 50B.

If there isn't an interrupt, then the program determines if the time period has elapsed 52C. Until the time has elapsed, the program loops back checking for an interrupt 52B; upon the completion of the time period, the program loops back to again withdraw the contents of the host computer 51C, and the program continues.

This embodiment of the invention is powerful in that the contents are only refreshed if the contents of the host computer have lost their integrity.

Figure 6:
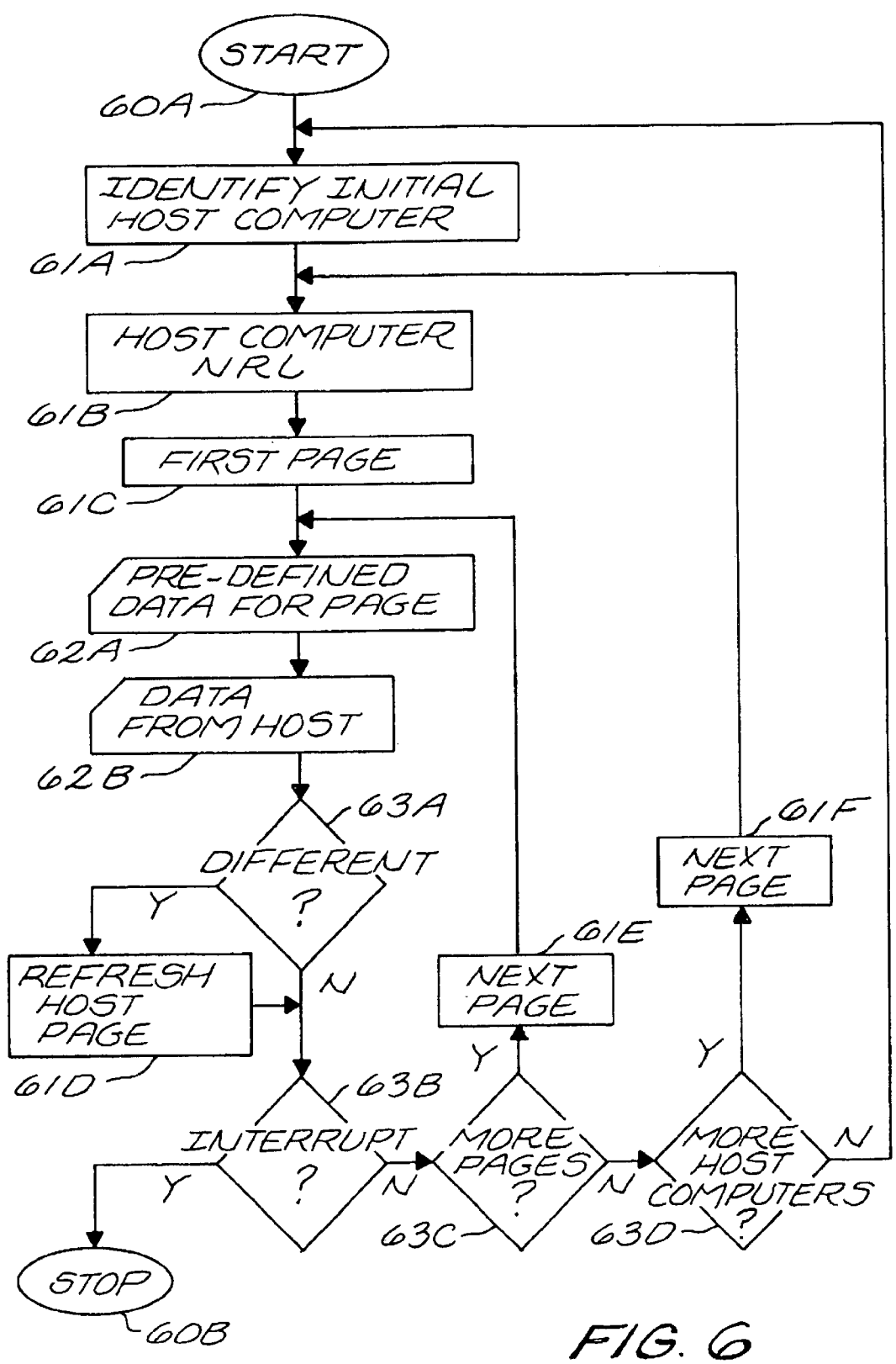
FIG. 6 is a flowchart of an embodiment of the invention in which a single refresh computer is used to monitor and up-date numerous hosting computers.

FIG. 6 is a flowchart of an embodiment of the invention in which a single refreshing computer is used to monitor and up-date numerous hosting computers.

After start 60A, the program establishes the first host computer to monitor 61A. The selected host computer's URL is established 61B and the first page within that host computer is established 61C.

The pre-defined data for the page in question is withdrawn 62A and the page from the host computer is obtained 62B.

A comparison of the two is made to see if there is a difference 63A. If there is a discrepancy, then the page is refreshed 61D.

The program checks for an interrupt 63B and stops 60B if an interrupt is sensed.

If no interrupt 63B has occurred, then a determination is made on if there are more pages to review for the host computer 63C. If there are more pages, then the next page is identified 61E and the pre-defined data for that page is withdrawn from memory 62A.

Should there not be any more pages to review for that specific host computer 63C, then a determination is made on if there are any more host computers to review 63D. If there are, then the next host computer 61F is identified and that host computer's URL is obtained 61B. The program loops back 61B to repeat the process for this newly identified host computer.

If there are no more host computers to review 63D, then the program returns to the initial host computer 61A and the process continues.

In this manner, the contents of many different host computers are reviewed and refreshed by a single refresh computer.

FIG. 7 is a block diagram of a system which places the refresh computer and the hosting computer within a single housing.

As noted earlier, housing 25 contains both hosting computer 22B and refresh computer 23B. Hosting computer 22B has its own CPU 70A which communicates with memory 72A and with the internet 76 via modem 71.

Refresh computer 23B has CPU 70B communicating with memory 72B. It is within memory 72B that the pre-defined data is stored. Input interface 73 permits user 75 to communicate data to CPU 70B. CPU 70B is able to display information for the user via display interface 74 which drives a visual monitor 76.

In this way, a single housing is used. The user is able to create the web-page via input interface 73, have it stored in memory 72B; thereafter, CPU 70B places this web-page into memory 72A for dissemination on the Internet 76 via modem 71 by CPU 70A; further, the web-page in memory 72A is refreshed by CPU 70B as outlined above to assure the integrity of the web-page.

It is clear that the present invention provides for a highly improved system for assuring that the integrity of publicly available information remains uncorrputed.

What is claimed is:

1. A computer system comprising:
   a) a first computer having memory therein, said memory containing data being provided to a remote computer by said first computer via a computer network;
   b) a second computer communicating with said first computer and having stored therein a pre-determined informational packet, said second computer having means for automatically refreshing the memory of said first computer with said pre-determined informational packet; and,
   c) a housing containing said first computer and the second computer.

2. The computer system according to claim 1, wherein said second computer further includes:
   a) means for identifying if the data within said first computer is different than said pre-determined informational packet; and,
   b) means, responsive to said means for identifying, for activating said means for automatically refreshing the memory of said first computer.

3. The computer system according to claim 2, wherein said second computer and the first computer communicate via said computer network.

4. The computer system according to claim 2, wherein said second computer and the first computer communicate via a second computer network.

5. The computer system according to claim 1, wherein said means for automatically refreshing the memory of said first computer is activated at defined time intervals.

6. The computer system according to claim 5, wherein said defined time interval is established by an operator of said second computer.

7. The computer system according to claim 1,
   a) wherein the memory of said first computer includes numerous sets of data; and,
   b) wherein said second computer includes,
      1) numerous sets of pre-determined information packets, each pre-determined information packet associated with a unique one of said numerous sets of data in said memory of said first computer,
      2) means for identifying which ones of said numerous sets of data within the memory of said first computer have been altered, and,
      3) means, responsive to said means for identifying, for automatically refreshing any set of data within said first computer which has been altered with an associated pre-determined information packet.

8. The computer system according to claim 1, wherein the memory of said first computer includes remote-user data which has been at least partially defined by a user of the remote computer via said computer network.

9. The computer system according to claim 8, wherein said second computer includes:
   a) means for withdrawing said remote-user data from the memory of said first computer; and,
   b) erasing said remote-user data within the memory of said first computer.

10. The computer system according to claim 9, where said second computer further includes means for adding said remote-user data to a memory of said second computer.

11. The computer system according to claim 10, wherein said means for withdrawing and said means for erasing are automatically and periodically activated.

12. A system comprising:
   a) a first computer communicating information from memory to a remote computer via a computer network;
   b) a second computer automatically refreshing the information within the memory of said first computer; and,
   c) a housing containing said first computer and said second computer.

13. The system according to claim 12, wherein, prior to refreshing the information within the first computer, said second computer determines if the information within the first computer is different than the information within said second computer.

14. The system according to claim 12, wherein said second computer refreshes the information within the first computer at defined time intervals.

15. The system according to claim 14, wherein the memory of said first computer includes remote-user data which has been at least partially defined by a user of the remote computer.

16. The system according to claim 15, wherein said second computer includes:
   a) means for withdrawing said remote-user data from the memory of said first computer; and,
   b) erasing said remote-user data within the memory of said first computer.

17. The system according to claim 16, wherein said second computer further includes means for adding said remote-user data to a memory of said second computer.

18. A network of computers comprising:
   a) a network permitting information to be communicated between computers;
   b) at least one remote computer; and,
   c) a housing having contained therein,
      1) a hosting computer having memory therein, said memory containing numerous sets of data, said hosting computer providing a selected one of said sets of data to the remote computer via said network,
      2) a refresh computer communicating with said hosting computer, said refresh computer having,
         A) numerous sets of pre-determined information packets, each pre-determined information packet associated with a unique one of said numerous sets of data in the memory of said hosting computer,
         B) means for identifying which ones of said numerous sets of data within the memory of said hosting computer have been altered, and,
         C) means, responsive to said means for identifying, for automatically refreshing any set of data within said hosting computer which has been altered with an associated pre-determined information packet.

19. The network of computers according to claim 18, wherein the hosting computer and the refresh computer communicate via the network.

20. The network of computers according to claim 18, wherein the hosting computer and the refresh computer communicate via a second network.

* * * * *